US010685342B2

(12) United States Patent
Chauhan (10) Patent No.: US 10,685,342 B2
(45) Date of Patent: Jun. 16, 2020

(54) SYSTEMS AND METHODS FOR USE IN ROUTING FUNDS, ASSOCIATED WITH TRANSACTIONS, TO DIRECT-PAY ACCOUNTS

(71) Applicant: MASTERCARD INTERNATIONAL INCORPORATED, Purchase, NY (US)

(72) Inventor: Rohit Chauhan, Somers, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1071 days.

(21) Appl. No.: 14/958,285

(22) Filed: Dec. 3, 2015

(65) Prior Publication Data

US 2017/0161715 A1 Jun. 8, 2017

(51) Int. Cl.
*G06Q 40/00* (2012.01)
*G06Q 20/24* (2012.01)
(Continued)

(52) U.S. Cl.
CPC ............. *G06Q 20/24* (2013.01); *G06Q 20/10* (2013.01); *G06Q 20/26* (2013.01)

(58) Field of Classification Search
CPC ......... G06Q 40/02; G06Q 20/10; G06Q 20/24
See application file for complete search history.

(56) References Cited

U.S. PATENT DOCUMENTS 6,826,544 B1 * 11/2004 Johnson ................. G06Q 20/04
705/35
9,892,458 B1 * 2/2018 Shearer ................ G06Q 40/025
(Continued)

FOREIGN PATENT DOCUMENTS

IN 1411/CHE/2009 * 3/2016 ............ G06Q 20/24
KR 20040095390 * 11/2004 ............ G06Q 20/24
(Continued)

OTHER PUBLICATIONS

Julie Hill, "Merchant Cash Advances," The Conglomerate Business Law and Economics Society, https://www.thecongolmerate.org (Year: 2008).*
(Continued)

*Primary Examiner* — Alexander G Kalinowski
*Assistant Examiner* — William B. Bunker
(74) *Attorney, Agent, or Firm* — Harness, Dickey & Pierce, P.L.C.

(57) ABSTRACT

Systems and methods are provided for rerouting funds, associated with transactions between consumers and merchants, to direct-pay accounts associated with creditors that provide loan and/or credit arrangements to the merchants. One exemplary method generally includes identifying, by a computing device, funds directed to a primary payment account associated with a merchant during settlement of at least one transaction for which funds are directed to the merchant. The computing device then routes a first portion of the funds to a direct-pay account associated with a creditor of the merchant, whereby the first portion of the funds is delivered to the direct-pay account in service of a debt between the creditor and the merchant, without the first portion of the funds being appended to the primary account associated with the merchant. The computing device then also routes a second portion of the funds to the primary account associated with the merchant.

16 Claims, 3 Drawing Sheets

(51) Int. Cl.
*G06Q 20/10* (2012.01)
*G06Q 20/26* (2012.01)

(56) References Cited

U.S. PATENT DOCUMENTS

| | | | |
|---|---|---|---|
| 10,019,698 B1 * | 7/2018 | Scott | G06Q 40/025 |
| 10,032,153 B2 * | 7/2018 | Luongo | G06Q 20/207 |
| 10,453,086 B1 * | 10/2019 | Scott | G06Q 20/24 |
| 10,565,642 B1 * | 2/2020 | Cieri | G06Q 40/025 |
| 10,607,286 B1 * | 3/2020 | Poursartip | G06Q 20/20 |
| 2008/0052229 A1 * | 2/2008 | Sheinker | G06Q 20/10 705/40 |
| 2008/0071654 A1 * | 3/2008 | Cohen | G06Q 40/00 705/35 |
| 2008/0195534 A1 * | 8/2008 | Landis | G06Q 20/10 705/39 |
| 2009/0043697 A1 * | 2/2009 | Jacobs | G06Q 20/10 705/39 |
| 2010/0228672 A1 * | 9/2010 | Karim | G06Q 20/40 705/44 |
| 2010/0318447 A1 * | 12/2010 | McKinney | G06Q 40/12 705/30 |
| 2012/0066033 A1 * | 3/2012 | Frohwein | G06Q 40/08 705/14.1 |
| 2013/0226684 A1 * | 8/2013 | Hammad | G06Q 20/20 705/14.23 |
| 2014/0188586 A1 * | 7/2014 | Carpenter | G06Q 20/02 705/14.23 |
| 2014/0358766 A1 * | 12/2014 | Nayyar | G06Q 40/025 705/38 |

FOREIGN PATENT DOCUMENTS

| | | | | |
|---|---|---|---|---|
| KR | 20140127493 | * | 11/2014 | G06Q 40/02 |
| WO | WO9903075 | * | 1/1999 | G06Q 20/24 |

OTHER PUBLICATIONS

Susan Herbst-Murphy, "Clearing and Settlement of Interbank Card Transactions," Discussion Paper—Payment Cards Center, Federal Reserve Bank of Philadelphia, www.philadelphiafed.org/payment-cards-center (Year: 2013).*

* cited by examiner

SYSTEMS AND METHODS FOR USE IN ROUTING FUNDS, ASSOCIATED WITH TRANSACTIONS, TO DIRECT-PAY ACCOUNTS

FIELD

The present disclosure generally relates to systems and methods for use in routing funds, associated with purchase transactions between consumers and merchants, for example, to direct-pay accounts of creditors associated with the merchants.

BACKGROUND

This section provides background information related to the present disclosure which is not necessarily prior art.

Use of payment accounts by consumers to fund purchase transactions for products (e.g., good and services, etc.) at merchants has become ubiquitous. The transactions generally define transfers of funds, in the amounts of the purchases, from accounts associated with the consumers to accounts associated with the merchants. More specifically, issuers of the payment accounts interact with payment networks to transfer the funds to acquirers associated with the merchant accounts. The acquirers then transfer the funds, as appropriate, to the merchants via their accounts. Separately, merchants often rely on one or more different loan products (e.g., loans, lines of credit, etc.), for example, to purchase products and/or items used in the operation of their businesses, to pay wages for employees of the merchants, to fund improvements to the merchants, and/or to satisfy other costs associated with their operations. The loan products often involve the merchants making monthly payments to the providers of the loan products, to reduce or payoff amounts used by the merchants in connection with the loan products.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are often relied upon, by consumers, to purchase products from merchants. Transactions to the consumer payment accounts generally define fund transfers (e.g., based on available funds and/or credit for the payment accounts, etc.) from the accounts to primary accounts associated with the merchants. Separately, the merchants may use funds provided by creditors (e.g., banking institutions, merchants, etc.) through various loan and/or credit arrangements to pay for operating costs and other expenses. In turn, the merchants make payments to the creditors, over a period of time (e.g., monthly, etc.), to repay the funds. However, availability and/or conditions of such arrangements, often, are based on various ratings of the merchants (e.g., credit ratings, etc.), which may or may not accurately represent the merchants' ability to repay the creditors. The systems and methods herein provide for access, by the merchants, to certain loan and/or credit arrangements, whereby, in exchange for the arrangements, the merchants direct payment networks to route at least a portion of incoming funds from purchase transactions (effected from consumer payment accounts) to direct-pay accounts associated with the creditors providing the arrangements. As such, certain funds directed to the merchants' primary accounts, as part of settlement of purchase transactions with consumers, are uniquely routed, instead, to the direct-pay accounts associated with the creditors, without further directions of the merchants or even access of the merchants to the funds. Thus, through the systems and methods herein, the creditors are generally guaranteed at least some payment as long as the merchants are operating. In addition, the creditors providing the loan and/or credit arrangements are able to be more confident in extending such arrangements to the merchants who, for one reason or another, may not otherwise qualify for the arrangements (e.g., due to size, lack of operating history, credit rating, etc.).

Figure 1:
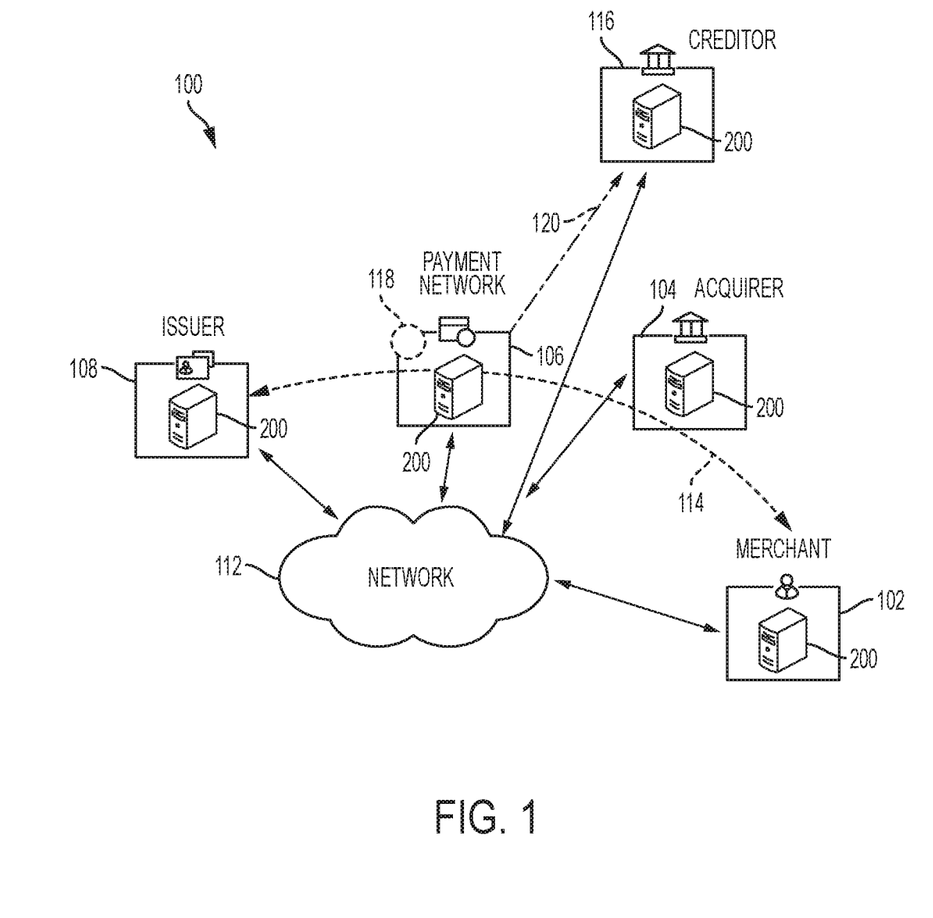
FIG. 1 is a block diagram of an exemplary system of the present disclosure suitable for use in routing funds associated with purchase transactions at a merchant to a direct-pay account associated with a creditor associated with a loan and/or credit arrangement provided to the merchant.

FIG. 1 illustrates an exemplary system 100, in which the one or more aspects of the present disclosure may be implemented. Although the system 100 is presented in one arrangement, other embodiments may include systems arranged otherwise depending, for example, on a manner of processing payment account transactions, on a manner of providing loan and/or credit arrangements, etc.

As shown in FIG. 1, the system 100 generally includes a merchant 102, an acquirer 104, a payment network 106, and an issuer 108, each coupled to (and in communication with) network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 112 may include multiple different networks, such as a private payment transaction network made accessible by the payment network 106 to the acquirer 104 and the issuer 108 and, separately, the public Internet, which is accessible as desired to the merchant 102, the acquirer 104, the payment network 106, the issuer 108, etc.

The merchant 102 is generally associated with products (e.g., goods and/or services, etc.) for purchase by one or more consumers, for example, via payment accounts associated with the consumers (and provided by the issuer 108, etc.). The merchant 102 may include an online merchant, having a virtual location on the Internet (e.g., a website accessible through the network 112, etc.), or through a web-based application, etc., to permit consumers to initiate transactions for products offered by the merchant 102 for purchase. In addition, or alternatively, the merchant 102 may include at least one brick-and-mortar location.

In connection with a purchase by a consumer at the merchant 102, via a payment account issued to the consumer by the issuer 108, for example, an authorization request is generated at the merchant 102 and transmitted to the acquirer 104, consistent with path 114 in FIG. 1. The acquirer 104, in turn, as further indicated by path 114, communicates the authorization request to the issuer 108, through the payment network 106, such as, for example, through MasterCard®, VISA®, Discover®, American Express®, etc., to determine (in conjunction with the issuer 108) whether the payment account is in good standing and whether there is sufficient credit/funds to complete the transaction. If the issuer 108 accepts the transaction, a reply authorizing the transaction is conventionally provided back to the acquirer 104 and the merchant 102, thereby permitting the merchant 102 to complete the transaction. If the issuer 108 declines the transaction for any reason, a reply declining the transaction is provided back to the merchant 102, thereby permitting the merchant 102 to stop the transaction.

If approved, the transaction is then conventionally cleared and settled by and between the merchant 102 and the acquirer 104 (via an agreement between the merchant 102 and the acquirer 104), and by and between the acquirer 104 and the issuer 108 (via an agreement between the acquirer 104 and the issuer 108), through further communications therebetween as needed. In particular, the acquirer 104 reconciles the transaction for the merchant 102 and transmits it (e.g., in a batch clearing file with other transactions for the merchant 102, etc.) to the payment network 106 (i.e., to a clearing aspect of the payment network 106), etc. The payment network 106, in turn, settles the transaction by debiting funds from an account at the issuer 108 (as defined by a clearing record received from the acquirer 104 in transmitting the transaction) and crediting the funds for the net amount of the transaction, less any interchange and/or network fees, to the acquirer 104 (also consistent with path 114). Finally, the issuer 108 records the transaction against the consumer's payment account (for payment by the consumer based on an agreement between the consumer and the issuer 108), and the acquirer 104 credits, or appends, an amount due to the merchant 102 to a primary account associated with the merchant 102.

Transaction data is generated, collected, and stored as part of the above interactions among the merchant 102, the acquirer 104, the payment network 106, the issuer 108, and the consumer. The transaction data represents at least a plurality of transactions, for example, authorized transactions, cleared/settled transactions, attempted transactions, etc. The transaction data, in this exemplary embodiment, is stored at least by the payment network 106 (e.g., in a data structure associated with the payment network 106, etc.). The transaction data includes, for example, payment instrument identifiers such as payment account numbers, amounts of the transactions, merchant IDs, merchant category codes (MCCs), dates/times of the transactions, products purchased and related descriptions or identifiers, etc. It should be appreciated that more or less information related to transactions, as part of either authorization, clearing, and/or settling, may be included in transaction data and stored within the system 100, at the merchant 102, the acquirer 104, the payment network 106, and/or the issuer 108.

With continued reference to FIG. 1, the system 100 also includes a creditor 116. The creditor 116 may include any entity, which offers and/or provides any form of loan and/or credit arrangements for use, for example, by the merchant 102 or others to pay for other costs or expenses (e.g., operating costs of the merchant 102, etc.). Without limitation, the creditor 116 may include, for example, a banking institution offering loans and/or lines of credit to the merchant 102 (e.g., loan services, etc.) (broadly, loan and/or credit arrangements), another merchant (broadly, a creditor merchant) separate from merchant 102 who offers products (e.g., inventory, supplies, utilities, etc.) for sale on credit, payment plans, (broadly, loan and/or credit arrangements), etc. Generally, the merchant 102 contracts with the creditor 116, pursuant to such loan and/or credit arrangements, where products (e.g., goods and services, funds, etc.) are provided in exchange for a promise to pay one or more amounts to the creditor 116 at one or more regular or irregular intervals.

While one merchant 102, one acquirer 104, one payment network 106, one issuer 108, and one creditor 116 are illustrated in the system 100 in FIG. 1, it should be appreciated that any number of these entities (and their associated components) may be included in the system 100, or may be included as a part of systems in other embodiments, consistent with the present disclosure.

Figure 2:
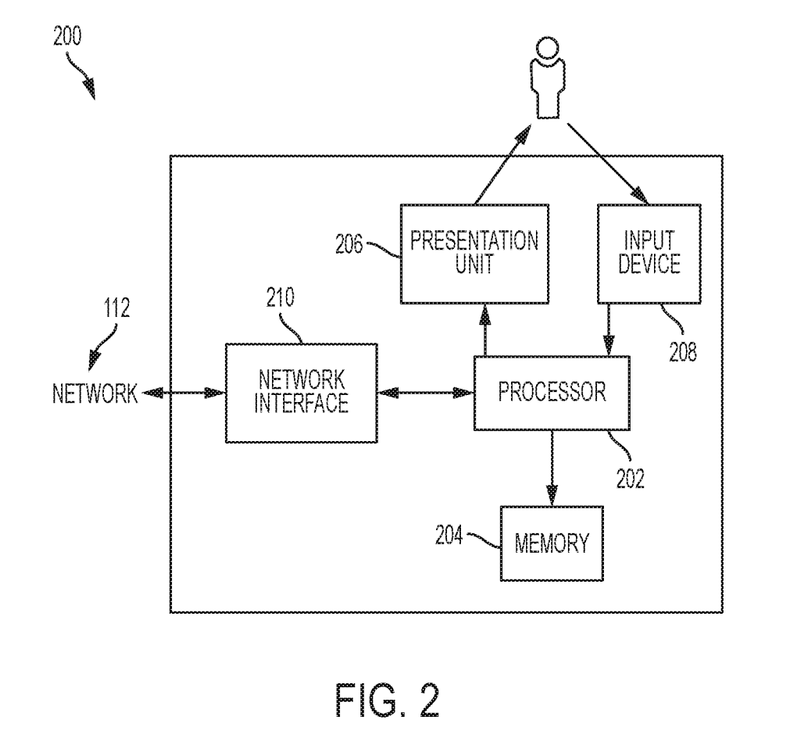
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the merchant 102, the acquirer 104, the payment network 106, the issuer 108, and the creditor 116 are illustrated as including, or being implemented in or associated with, a computing device 200, coupled to the network 112. Further, the computing devices 200 associated with these parts of the system 100, for example, may include a single computing device, or multiple computing devices located in close proximity or distributed over a geographic region, again, so long as the computing devices are specifically configured to function as described herein.

Referring to FIG. 2, the exemplary computing device 200 includes a processor 202 and a memory 204 coupled to (and in communication with) the processor 202. The processor 202 may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, clearing batch files, various thresholds, apportionment parameters, account numbers/identifiers, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In addition, the illustrated computing device 200 includes a presentation unit 206 that is coupled to (and in communication with) the processor 202 (however, it should be appreciated that the computing device 200 could include output devices other than the presentation unit 206, etc.). The presentation unit 206 outputs information, either visually or audibly to a user of the computing device 200, etc. It should be further appreciated that various interfaces (e.g., as defined by web-based applications, webpages, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) of the computing device 200. The input device 208 is coupled to (and in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

The computing device 200 further includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 112. Further, in some exemplary embodiments, the computing device 200 includes the processor 202 and one or more network interfaces incorporated into or with the processor 202.

Referring again to FIG. 1, the system 100 includes a direct-pay engine 118, which is specifically configured, by executable instructions, to perform one or more of the operations herein. As shown in FIG. 1, the engine 118 is illustrated generally as associated with and included in the payment network 106. But it should be appreciated, as indicated by the dotted lines, that the engine 118 may be incorporated with or associated otherwise, as desired. For example, the engine 118 may be a separate standalone part of the system 100, or the engine 118 may be incorporated with the acquirer 104 or other part of the system 100. In general, the engine 118 may be implemented and/or located, based on where a transaction (and a value of the transaction) is to be apportioned and routed to particular accounts associated with the merchant 102 and/or the creditor 116, as described herein. In addition, the direct-pay engine 118 may be implemented in the system 100 in a computing device consistent with computing device 200 (e.g., as part of the payment network's computing device 200, or separate therefrom; etc.), or in other computing devices within the scope of the present disclosure.

Generally, as part of a loan and/or credit arrangement between the merchant 102 and the creditor 116, the creditor 116 provides products (e.g., loan services, credit services, goods, etc.) to the merchant 102 and, in exchange, the merchant 102 agrees to pay the creditor 116 over one or more intervals. More specifically in the system 100, the merchant 102 and the creditor 116 agree that funds typically directed to the merchant's primary account, in connection with clearing and settling of payment account transactions made at the merchant 102, be apportioned and routed as necessary to pay the creditor 116, as indicated by path 120 in FIG. 1. For example, the merchant 102 and the creditor 116 may agree that a portion of the funds be routed to a direct-pay account associated with the creditor 116 to pay the creditor 116 in accordance with the loan and/or credit arrangement. Further, in some embodiments, another portion of the funds may be routed to a fee account associated with the payment network 106, as a fee or charge for managing the arrangement. The remaining portion of the funds may then be routed to the merchant's primary account in a conventional manner. The various portions may be determined by the merchant 102, the payment network 106, and/or the creditor 116 based on parameters included in the loan and/or credit arrangement, business dealings between the parties, or other factors.

In various embodiments, a single loan/credit transaction to the creditor 116 will be included in a given clearing record (i.e., one transaction per clearing record). In addition, in various embodiments, the direct-pay engine 118 (or other part of the system 100) may embed an identifier (e.g., a loan ID, etc.) in the clearing record associated with a loan/credit transaction, to help link a particular payment (or portion thereof) to the creditor 116 (and the payment network 106, when appropriate). The identifier may relate to, for example, one or more of a total payment made, a month-to-date amount paid, a life-to-date amount paid, and a total remaining balance.

In connection therewith, the direct-pay engine 118 is configured to store direct-pay rules, which are defined by the loan and/or credit arrangement (or by other factors) between the merchant 102, the payment network 106, and/or the creditor 116. For example, the engine 118 may store the direct-pay rules in a data structure in memory 204. The direct-pay rules may include any various data relating to the arrangement including, for example, an identification of the primary account of the merchant 102, an identification of the acquirer 104, an identification of a direct-pay account of the creditor 116, apportionment parameters directing the engine 118 on a number of portions to be made, apportionment parameters directing the engine 118 as to when portions are to be made, apportionment parameters directing the engine 118 as to a value of each of the portions, etc. The apportionment, by the engine 118, may be based on the apportionment parameters included in the rules, which may include, for example, fixed percentages (e.g., 5%, 10%, etc.), threshold percentages (e.g., 5% for funds over $100.00, etc.), fixed amounts (e.g., $5.00 per day, $0.20 per transaction, etc.), threshold amounts (e.g., $15.00 for funds over $150.00, etc.), etc.

During the clearing and/or settlement of a payment account transaction (or multiple such transactions) involving the merchant 102, the direct-pay engine 118 is configured to invoke the direct-pay rules relating to the merchant 102, and identify the corresponding funds being transferred to the merchant's primary account. Upon identifying the funds, the direct-pay engine 118 interrupts the transfer and apportions the funds, according to the apportionment parameters included in the invoked rules, between the merchant's primary account (i.e., the original destination of the funds) and the direct-pay account associated with the creditor 116 (and potentially a fee account associated with the payment network 106). Once apportioned, the engine 118 is then configured to cause a portion of the funds to be routed to the merchant's primary account and a different portion of the funds to be routed the creditor's direct-pay account, and potentially other portions elsewhere as indicated by the arrangement (or multiple arrangements) for the merchant 102. As described above, in various embodiments, the engine 118 may include a single transaction in a given clearing record, and/or may embed an identifier in the identified clearing record (or otherwise modify the clearing record) to help link (and/or identify) a particular payment to the creditor 116 (and, when appropriate, the payment network 106).

Further, in various embodiments, the direct-pay engine 118 is configured to transmit apportionment records to the merchant 102, the acquirer 104, and/or the creditor 116. These apportionment records may permit the merchant 102, the acquirer 104, and/or the creditor 116 to reconcile discrepancies in expected funds and/or confirm compliance with direct-pay arrangement(s) to which they are associated. The apportionment records may be transmitted, by the engine 118, daily, (e.g., following completion of clearing and/or settlement), weekly, monthly, or otherwise, etc. What's more, reporting could be done at regular intervals based on the merchant 102 and/or creditor 116 involved, or by an identifier included in the corresponding clearing record, relating to, for example, a total payment made on the day, a month-to-date number/amount of payments made, a life-to-date number/amount of payments made, a total remaining balance, etc.

Figure 3:
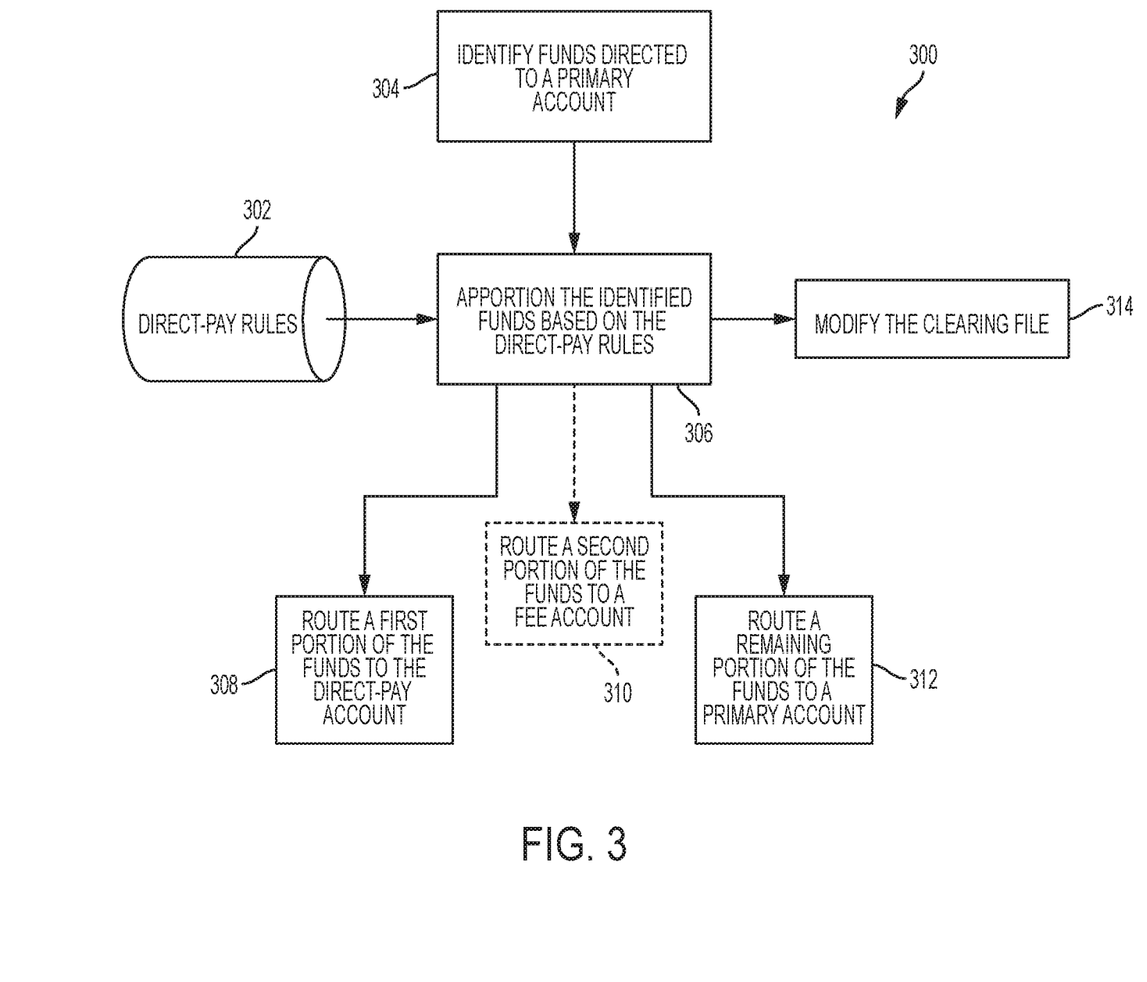
FIG. 3 is an exemplary method that may be implemented in connection with the system of FIG. 1 for routing funds associated with purchase transactions at a merchant to a direct-pay account of a creditor associated with the merchant.

FIG. 3 illustrates an exemplary method 300 for routing funds, based on purchase account transactions, to direct-pay accounts in connection with one or more loan and/or credit arrangements. The exemplary method 300 is described as implemented in the direct-pay engine 118 of system 100, with additional reference to the merchant 102, the acquirer 104, the payment network 106, the issuer 108, and the creditor 116. However, it should be understood that the method 300 is not limited to the engine 118 or the arrangement of parts in the illustrated system 100, as the method 300 may be implemented in other ones of the computing devices 200 in system 100, or in multiple other computing devices. In addition, the methods herein should not be understood to be limited to the exemplary system 100 or the exemplary computing device 200, and likewise, the systems and the computing devices herein should not be understood to be limited to the exemplary method 300.

The method 300 is described in connection with a debt arrangement between the merchant 102 and the creditor 116, where the creditor 116 provides a debt product (e.g., a loan of funds, etc.) to the merchant 102. In exchange, the merchant 102 agrees to pay the creditor 116, as appropriate, by permitting funds typically directed to the primary account of the merchant 102 to be routed, instead, to a direct-pay account associated with the creditor 116.

In connection with the debt arrangement, the merchant 102 and the creditor 116 provide various direct-pay rules that pair the merchant 102 and the creditor 116 and dictate how the merchant's funds are to be apportioned, in order to pay the creditor 116. The direct-pay rules include various data relating to the loan arrangement. For example, the direct-pay rules include apportionment parameters that indicate an amount of funds (broadly, an apportionment parameter) to be apportioned (e.g., a fixed percentage, a fixed amount per transaction, etc.), and a maximum amount of funds (broadly, a threshold) to be apportioned in total or over a time period (e.g., $500 per month, etc.) such that the apportionment stops when the threshold is reached. The direct-pay rules also include data relating to the creditor 116, such as (and without limitation) a name of the creditor and an account number for the creditor's direct-pay account, and data relating to the merchant, such as (and without limitation) a name of the merchant 102 and an account number for the merchant's primary account.

The apportionment parameters included in the direct-pay rules may indicate any various rules agreed upon and/or proposed, or required, by one or more of the merchant 102, the payment network 106, and the creditor 116. For example, apportionment parameters may define fixed percentages or amounts of the merchant's funds to be apportioned to the creditor (e.g., 5%, 10%, 15%, $5.00, etc. per transaction; $5.00 per clearing record; etc.), for all identified funds directed to the merchant's primary account. As another example, apportionment parameters may define conditional or threshold percentages or amounts of the merchant's funds to be apportioned to the creditor, where the percentages or amounts only apply for funds over predefined amounts (e.g., 5% for funds over $100.00, 5% for the first 100 transactions, $15.00 for funds over $150.00, etc.). Moreover, the conditional percentages may be tiered, where different percentages apply for funds over different predefined amounts (e.g., 5% for funds over $100.00 and 2.5% for funds over $500.00, etc.). As still another example, apportionment parameters may define threshold amounts of the merchant's funds to be apportioned to the creditor, that limit a total amount of the funds to be apportioned to the creditor (e.g., $1,000.00; $5,000.00; etc.), etc. Further, the threshold amounts may be time based, for example, per week, per month, etc.

As shown in FIG. 3, once the debt arrangement is established between the merchant 102 and the creditor 116, the direct-pay engine 118 stores the corresponding direct-pay rules in data structure 302 (e.g., in memory 204 of computing device 200 associated with the direct pay engine 118, etc.). The engine 118 may also store an indication of the relationship between the merchant 102 and the creditor 116 in the data structure 302 (or in another data structure) to help identify transactions (e.g., via clearing records, etc.) subject to the debt arrangement between the merchant 102 and the creditor 116 as they are processed by the payment network 106 (e.g., based on an identification of a merchant ID associated with the merchant 102 in the transaction data, etc.).

Then, at 304 in the method 300, the direct-pay engine 118 identifies funds to be apportioned in accordance with one or more direct-pay rules stored in data structure 302. In particular in the method 300, the funds are identified by the direct-pay engine 118 based on being directed to the primary account of the merchant 102 during settlement of a transaction that generated the funds (e.g., as settlement of the transaction proceeds along path 114 in the system 100, etc.). The direct-pay engine 118 may continually monitor transfers along path 114, for example, for the funds, or the direct-pay engine 118 may receive indicators from the merchant 102 that such funds are being transferred.

For example, the direct-pay engine 118 may identify the funds based on the account number for the primary account of the merchant 102. Or, the direct-pay engine 118 may instead identify the funds based on transaction data included in clearing records directing settlement of the funds from the various payment account transactions. Such transaction data may include a transaction ID, an acquirer ID, a merchant ID, or a combination thereof, etc. In one particular example, a loan identifier may be embedded in the clearing record (e.g., by the engine 118, etc.) to help link a payment to the creditor 116 (and/or a specific loan and/or credit arrangement), during settlement. In another particular example, a loan identifier may be embedded in the authorization message (e.g., by the merchant 102, etc.) to help link a payment to the creditor 116 (and/or a specific loan and/or credit arrangement) during settlement. In addition, the direct-pay engine 118 may employ a data structure (which may be the same as data structure 302 or different therefrom) that includes identifiers for multiple primary accounts, including the primary account for the merchant 102, subject to direct-pay rules. For each settlement transaction, the direct-pay engine 118 can then look up the primary account involved to determine whether apportionment is required. Conversely, the direct-pay engine 118 may search each clearing file for the identifiers included in the data structure to determine whether apportionment is required during settlement.

In any case, once the funds are identified, the direct-pay engine 118 apportions the funds between the merchant 102 and the creditor 116 (and any other involved parties), at 306. In particular, in the method 300 where the identified funds belong to the merchant 102, the direct-pay engine 118 retrieves the direct-pay rules for the merchant 102 and creditor 116 pair (and potentially direct-pay rules for any other merchant-creditor pairs involving the merchant 102), from data structure 302. The direct-pay engine 118 then apportions the funds between the merchant's primary account and the creditor's direct-pay account (and any other accounts), as directed by the apportionment parameters included in the direct-pay rules.

In particular in the method 300, the direct-pay engine 118 routes a first portion of the funds to the direct-pay account of the creditor 116, at 308. In addition, the direct-pay engine 118 optionally (as indicated by the dotted lines in FIG. 3) routes a second portion of the funds to a fee account associated with the payment network 106, at 310, when required or applicable. The direct-pay engine 118 then routes a remaining portion of the funds to the primary account of the merchant, at 312.

As an example, the direct-pay engine 118 may identify, from clearing records routed through the payment network 106, funds of $1,000 being transferred to a primary account of the merchant 102 (involved in the merchant-creditor pair with creditor 116 in data structure 302). In response, the direct-pay engine 118 retrieves direct-pay rules for the merchant-creditor pair that include an apportionment parameter specifying that 5% of the identified funds be routed to the creditor 116, up to $500 per month and up to a maximum amount of $10,000. The direct pay rules also include an apportionment parameter specifying that the remaining funds be routed to the merchant 102 (specifically, to the merchant's primary account). In addition, the payment network 106 requires 2% of the funds apportioned to the creditor 116 be routed to the payment network's fee account as a fee or charge for managing the arrangement between the merchant 102 and the creditor 116. As such, in this example, the direct-pay engine 118 initially calculates the first portion of the funds to be $50.00 and routes the $50.00 to the direct-pay account of the creditor 116. The direct-pay engine 118 also calculates the fee for the payment network 106 to be $1, which it routes to the fee account of the payment network 106. The engine 118 then routes the remaining portion of the funds, an amount of $949, to the merchant's primary account.

Finally in the method 300, in connection with apportioning the funds and routing the portions as directed by the direct-pay rules, the direct-pay engine 118 modifies (e.g., updates, etc.) the appropriate clearing files, at 314, used to ultimately fund settlement of the apportioned funds between the appropriate parts of the system 100. In particular in the method 300, the direct-pay engine 118 modifies one clearing record directed to the creditor 116 to include the first portion of the funds, and also modifies a clearing record directed to the acquirer 104 associated with the merchant 102 to include the remaining portion of the funds. In some instances, this may include modifying a batch file received from the acquirer 104, including the underlying transaction(s).

In this manner, the funds apportioned to the creditor 116 are not routed to, and are not appended to, the primary account associated with the merchant 102. As such, the merchant 102 need not make any further decision in providing payment in service of the debt to the creditor 116, in order for funds to be transferred to the creditor 116, i.e., the payment is automatic and out of the control of the merchant 102. By removing the merchant 102 from the path of the funds (e.g., by creating path 120 in the system 100 of FIG. 1, etc.), the creditor 116 is generally guaranteed at least some payment as long as the merchant 102 is selling products and/or otherwise involved in payment account transactions. Based on this guaranteed payment, the creditor 116 is able to be more confident in extending such arrangements to the merchant 102, which may be otherwise ineligible or unqualified for the loan and/or credit arrangement offered from the creditor 116.

In some instances, the transactions underlying the funds routed to the direct-pay account of the creditor 116 may be reversed (e.g., such as when a consumer returns a product to the merchant 102 or otherwise requests a refund, etc.). In such instances, the direct-pay engine 118 acts to reverse the transfer of funds not only from the primary account associated with the merchant 102, as conventionally done, but also from the direct-pay account of the creditor 116. Specifically, in response to such a request to reverse a transaction, after funds related to the transaction have already been apportioned and routed, the direct-pay engine 118 may debit the first portion of the funds from the creditor's direct-pay account, the second portion of the funds (optionally) from the payment network's fee account, and the remaining portion of the funds from the merchant's primary account. The total funds, then, may be routed to the payment account associated with the consumer.

In the illustrated method 300, the direct-pay engine 118 apportions the funds between three different accounts, including the merchant's primary account, the creditor's direct-pay account, and the fee account associated with the payment network 106. It should be appreciated that the direct-pay engine 118 may apportion funds between any different number of accounts, other than three, in other embodiments. For example, when a merchant is associated with loan arrangements with two different creditors, the direct-pay engine 118 may apportion funds between a primary account associated with the merchant, two different direct-pay accounts associated with the two different creditors, as well as a fee account associated with a payment network that manages routing of funds to the various accounts involved.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be further appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) identifying funds directed to a primary payment account associated with a merchant during settlement of at least one transaction for which funds are directed to the merchant; (b) routing a first portion of the funds to a direct-pay account associated with a creditor of the merchant, whereby the first portion of the funds is delivered to the direct-pay account in service of a debt between the creditor and the merchant, without the first portion of the funds being appended to the primary account associated with the merchant; (c) routing a second portion of the funds to the primary account associated with the merchant; (d) appending a direct-pay rule to a data structure, the direct-pay rule including a number for the primary account associated with the merchant and at least one apportionment parameter defining the first portion of the funds; (e) apportioning the funds between at least the first and second portions based on said at least one apportionment parameter; (f) receiving a request for reversal of one of the at least one transaction, after routing the first and second portions of the funds, and: (1) debiting the first portion of the funds from the primary account; (2) debiting the second portion of the funds from the direct-pay account; and/or (3) routing the funds to an account associated with a consumer involved in said one of the at least one transaction; and (g) routing a third portion of the funds to a fee account associated with a payment network, the third portion of the funds including a fee associated with routing the first portion of the funds to the direct-pay account associated with the creditor.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in apportioning funds directed to merchants based on purchase transactions to payment accounts associated with merchants, the method comprising:

storing, by at least one computing device of a payment network, a direct-pay rule for a merchant in a data structure in a memory, the direct-pay rule including a merchant identifier for the merchant and defining an apportionment of network-based funds, payable to the merchant, between a payment account of the merchant and a direct-pay account of a creditor, the payment network coupled between an issuer and an acquirer associated with the merchant;

identifying, by the at least one computing device, in a first clearing record from the acquirer, a network-based fund transfer directed, via the payment network, to the payment account of the merchant during clearing and settlement of one or more transactions, the one or more transactions included in the first clearing record and directing funds to the payment account of the merchant, the network-based fund transfer identified based on the merchant identifier for the merchant embedded in the first clearing record;

interrupting, by the at least one computing device, the network-based fund transfer and apportioning funds of the network-based fund transfer into a first portion and a second portion based on the apportionment defined by the direct-pay rule, prior to deposit of the funds into the payment account of the merchant;

modifying a second clearing record associated with the creditor to include the first portion of the funds;

embedding an identifier in the second clearing record regarding one or more of: a relationship between the merchant and the creditor, a total payment to be made by the merchant to the creditor, a month-to-date amount paid by the merchant to the creditor, a life-to-date amount paid by the merchant to the creditor, or a total remaining balance of a debt associated with the direct-pay rule;

routing, by the at least one computing device, the first portion of the funds to the direct-pay account associated with the creditor consistent with the modified second clearing record, whereby the first portion of the funds is delivered to the direct-pay account in service of a debt between the creditor and the merchant, without the first portion of the funds being deposited to the payment account of the merchant;

modifying the first clearing record from the acquirer associated with the merchant to include the second portion of the funds;

routing, by the at least one computing device, the second portion of the funds to the payment account of the merchant consistent with the modified first clearing record, thereby completing the network-based fund transfer; and transmitting, by the at least one computing device, based on the embedded identifier in the second clearing record, one or more apportionment records to at least one of the merchant, the acquirer, or the creditor.

2. The computer-implemented method of claim 1, wherein the creditor includes a creditor merchant; and
wherein modifying the second clearing record associated with the creditor includes modifying the second clearing record from an acquirer associated with the creditor merchant to include the first portion of the funds, the acquirer associated with the creditor merchant different than the acquirer associated with the merchant.

3. The computer-implemented method of claim 1, wherein the payment account of the merchant is issued by the acquirer, and the direct-pay account is issued by a banking institution different than the acquirer.

4. The computer-implemented method of claim 1, wherein the first portion is less than 20% of the funds.

5. The computer-implemented method of claim 1, further comprising:
receiving a request for reversal of one of the one or more transactions, after routing the first and second portions of the funds;
debiting, by the at least one computing device, the first portion of the funds from the payment account;
debiting, by the at least one computing device, the second portion of the funds from the direct-pay account; and routing the funds to an account associated with a consumer involved in said one of the one or more transactions.

6. The computer-implement method of claim 1, wherein apportioning the funds of the network-based fund transfer further includes apportioning the funds of the network-based fund transfer into a third portion; and
further comprising routing the third portion of the funds to a fee account associated with the payment network, the third portion of the funds including a fee associated with routing the first portion of the funds to the direct-pay account of the creditor.

7. The computer-implemented method of claim 1, wherein routing the first portion and routing the second portion of the funds includes routing the first portion and routing the second portion in connection with settlement of the one or more transactions.

8. A system for use in processing transactions to payment accounts, the system comprising:
a memory including a data structure, the data structure including a direct-pay rule, the direct-pay rule defining an apportionment of network-based funds to a merchant between a payment account of the merchant and a direct-pay account of a creditor, the direct-pay rule including a merchant identifier for the merchant; and at least one computing device of a payment network coupled between one or more issuers and an acquirer associated with the merchant, the at least one computing device configured to:
identify a network-based fund transfer in a first clearing record, via the payment network, from the acquirer, to the payment account of the merchant during clearing and settlement of one or more transactions included in the first clearing record, the one or more transactions directing funds to the payment account of the merchant, the network-based fund transfer identified based on the merchant identifier for the merchant embedded in the first clearing record;

interrupt the network-based fund transfer;

apportion the funds of the network-based fund transfer between at least the creditor and the merchant, based on the apportionment defined in the direct-pay rule in the data structure, the apportionment defining at least one of a percentage or a minimal threshold for apportioning the funds;

modify the first clearing record associated with the payment account of the merchant based on the apportioned funds;

route the funds apportioned to the merchant to the payment account of the merchant consistent with the modified first clearing record;

modify a second clearing record associated with the direct-pay account of the creditor, based on the apportioned funds;

embed an identifier in the second clearing record associated with the direct-pay account regarding one or more of: a relationship between the merchant and the creditor, a total payment to be made by the merchant to the creditor, a month-to-date amount paid by the merchant to the creditor, a life-to-date amount paid by the merchant to the creditor, or a total remaining balance of a debt between the merchant and the creditor;

route the funds apportioned to the creditor to the direct-pay account of the creditor consistent with the modified second clearing record, whereby the funds apportioned to the creditor are delivered to the direct-pay account in service of a debt between the creditor and the merchant, without the funds apportioned to the creditor being deposited to the payment account of the merchant; and transmit, based on the embedded identifier in the second clearing record, one or more apportionment records to at least one of the merchant, the acquirer, or the creditor.

9. The system of claim 8, wherein the at least one computing device is further configured to debit at least a portion of the apportioned funds from the direct-pay account, when one of the one or more transactions underlying the network-based fund transfer is reversed between a consumer and the merchant.

10. The system of claim 8, wherein modifying the first clearing record associated with the payment account of the merchant includes modifying a batch file received from the acquirer associated with the merchant.

11. The system of claim 8, wherein the merchant identifier includes a account number associated with the account.

12. The system of claim 8, wherein the creditor includes a creditor merchant.

13. The computer-implemented method of claim 1, wherein the merchant identifier includes a number for the payment of the merchant.

14. A non-transitory computer-readable storage medium including executable instructions for apportioning funds directed to merchants based on purchase transactions to payment accounts associated with merchants, which when executed by at least one processor, cause the at least one processor to:

store a direct-pay rule in a data structure of a payment network, the direct-pay rule including a merchant identifier associated with a merchant and defining an apportionment of network-based funds payable to the merchant between a payment account of the merchant and a direct-pay account of a creditor, the payment network coupled between an issuer and an acquirer associated with the merchant;

identify, in a first clearing record from the acquirer, a network-based fund transfer directed, via the payment network, to the payment account of the merchant during clearing and settlement of one or more transactions directing funds to the payment account of the merchant, the network-based fund transfer identified based on the merchant identifier for the merchant embedded in the first clearing record;

interrupt the network-based fund transfer;

apportion funds of the network-based fund transfer into a first portion and a second portion based on the apportionment defined by the direct-pay rule, prior to deposit of the funds into the payment account of the merchant;

modify a second clearing record associated with the creditor to include the first portion of the funds;

embed an identifier in the second clearing record regarding one or more of: a relationship between the merchant and the creditor, a total payment to be made by the merchant to the creditor, a month-to-date amount paid by the merchant to the creditor, a life-to-date amount paid by the merchant to the creditor, or a total remaining balance of a debt associated with the direct-pay rule;

route the first portion of the funds to the direct-pay account associated with the creditor consistent with the modified second clearing record, whereby the first portion of the funds is delivered to the direct-pay account in service of a debt between the creditor and the merchant, without the first portion of the funds being deposited to the payment account of the merchant;

modify the first clearing record from the acquirer associated with the merchant to include the second portion of the funds;

route the second portion of the funds to the payment account of the merchant consistent with the modified first clearing record, thereby completing the network-based fund transfer; and transmit, based on the embedded identifier in the second clearing record, one or more apportionment records to at least one of the merchant, the acquirer, or the creditor.

15. The non-transitory computer-readable storage medium of claim 14, wherein the executable instructions, when executed by the at least one processor, cause the at least one processor to apportion the funds of the network-based fund transfer further into a third portion and to route the third portion of the funds to a fee account, the third portion of the funds including a fee associated with routing the first portion of the funds to the direct-pay account.

16. The non-transitory computer-readable storage medium of claim 14, wherein the apportionment defined by the direct-pay rule includes at least one apportionment parameter, and wherein the at least one apportionment parameter defines a percentage of the funds of the network-based fund transfer.

* * * * *